United States Patent Office 3,684,560
Patented Aug. 15, 1972

3,684,560
METHOD OF FORMING REFRACTORY MASSES
Edgar Brichard, Ransart, Maurice Jaupain, Jumet, Emile Plumat, Gilly, and Pierre Deschepper, Marcinelle, Belgium, assignors to Glaverbel S.A., Brussels, Belgium
Filed Nov. 3, 1970, Ser. No. 86,532
Claims priority, application Luxembourg, Nov. 4, 1969, 59,745
Int. Cl. B44d 1/00, 1/08
U.S. Cl. 117—105.1
22 Claims

ABSTRACT OF THE DISCLOSURE

Method of forming refractory masses, in situ, by applying to selected location a mixture of fine particles of a substance which is capable of undergoing combustion to produce heat and particles of another substance, the substances being of such composition that such heat will cause the adhesion of the surfaces of the obtained particles, and creating the conditions for producing such combustion.

BACKGROUND OF THE INVENTION

This invention relates to a process for forming refractory masses, particularly for forming refractory coatings on refractory blocks and other substrates. The process is useful, inter alia, for repairing or strengthening furnace linings in situ.

SUMMARY OF THE INVENTION

The present invention basically resides in a process for forming a refractory mass including projecting particles of at least one oxidizable substance which burns by combining with oxygen with accompanying evolution of heat, which particles have an average size of less than 50 microns, and particles of at least one other substance against a surface and burning the projected particles of an oxidizable substance in the presence of the projected particles of the other substance, the oxidizable and/or other substance being of such composition that under the heat of combustion a coherent refractory mass is formed from the oxidizable substance and the other substance.

The other substance, i.e. the particles which are used in conjunction with the fine oxidizable particles having an average size less than 50 microns, may be of a composition which also undergoes some oxidation, but for convenience in the following description the term "fine oxidizable particles" is reserved for the particles of the one substance. The particles of the other substance will similarly be referred to as the "other particles."

The other substance is preferably of such composition that at least the surfaces of its particles melt under the heat of combustion. In that case a very strongly coherent mass can be formed. However it is possible for the particles to be of compositions such that the cohesion of the final refractory mass is at least in part due to a chemical reaction and bonding between particles of different compositions.

The coherent refractory mass and the surface against which such mass is formed are preferably of such compositions that the mass adheres to the surface to form a coating. This relation is normally required in the event that the process is employed for forming a refractory coating on a substrate, e.g., a furnace lining. Such an adhesion may not be essential however when using the invention to form a refractory mass in situ in a joint or crevice of a furnace wall where the joint space or crevice may be so shaped that it will retain the refractory filling without adhesion.

The invention can also be used for forming refractory masses which can be removed, e.g. lifted off the surface against which they are formed, or so as to form refractory masses which by reason of the orientation of such surface fall away from such surface under gravity for use in some other context.

It is advantageous from the point of view of convenience for the oxidizable particles and the other particles to be mixed together and projected as a mixture against the surface on which the mass is to be formed. This procedure produces the most satisfactory results and minimum complications in bringing the different constituents together at the coating zone.

DESCRIPTION OF THE PREFERRED EMBODIMENT

Figure 1:
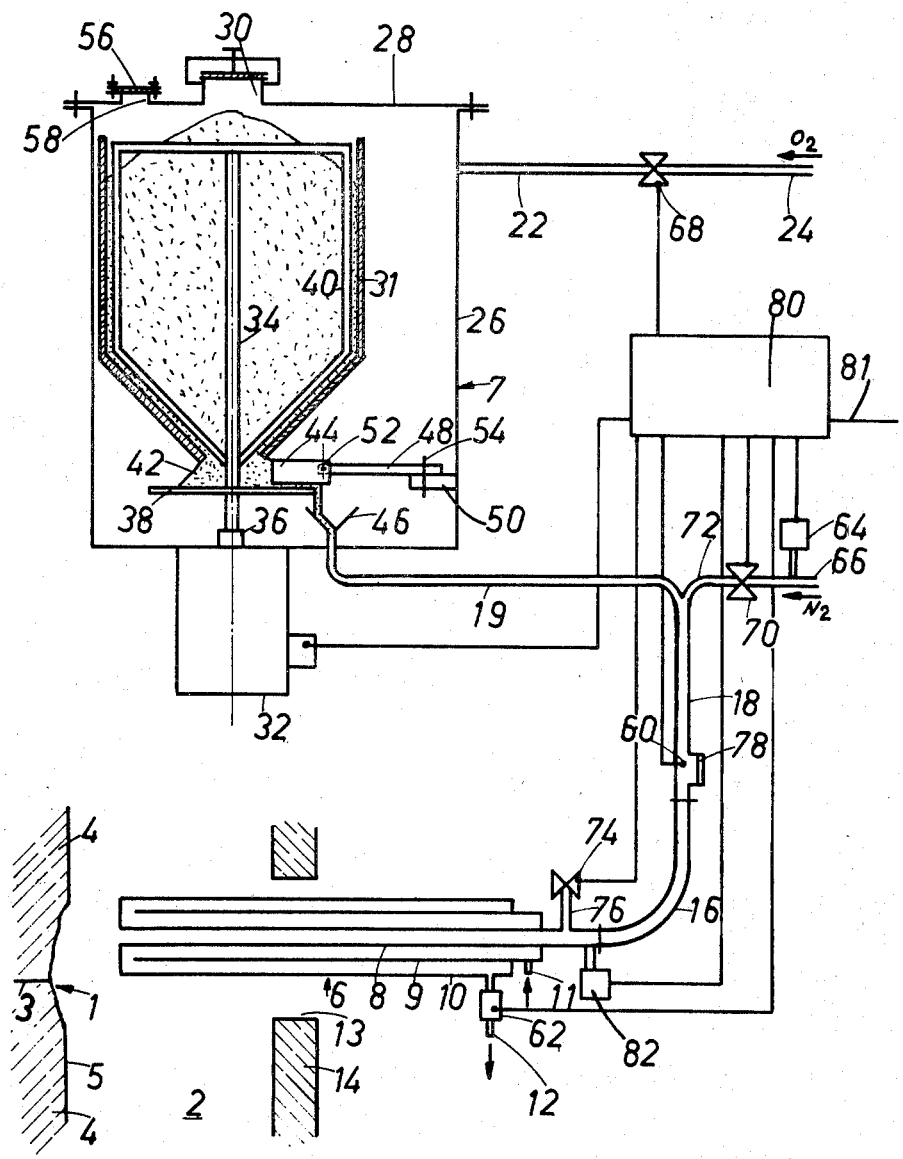
FIG. 1 is a partly cross-sectional, partly schematic view of one arrangement for forming refractory masses according to the invention.

The invention is based on experiments in which refractory metal oxides in discrete form were sprayed onto refractory surfaces together with particles of a combustible substance while the latter was undergoing combustion which was producing heat sufficient under the prevailing conditions to form a coherent refractory mass, for example as a result of softening or melting of the surfaces of the refractory oxide particles. At the same time it is possible for the refractory mass to adhere to the refractory surface to form a coating. After much experimental research it has been found that for the successful formation of refractory masses by this procedure certain conditions relating to the granulometry of the sprayed mixture are of unexpected importance. In particular, the combustible particles should have a very small average grain size.

Preferably the fine oxidizable particles are burned when substantially uniformly dispersed within the mass of other particles. In order that the process can be performed in this way, the relative sizes of the fine oxidizable particles and the other particles should be such that the fine oxidizable particles will remain substantially uniformly dispersed throughout the total particle mixture during projection of the mixture against the surface. The required results can be achieved, for example, by employing the preferred grain sizes for the starting materials, which will be specified below.

The combustion of the fine oxidizable particles may take place in air or some other oxygen-containing mixture. Preferably however the combustion takes place in oxygen alone. In any event the use of a substantial excess of oxygen is advantageous if complete combustion of the fine oxidizable particles is required.

According to an optional but particularly advantageous feature, the combustion-supporting gas, preferably oxygen alone, is used to project the fine oxidizable particles, and preferably also the other particles, towards the substrate to be coated; in other words, the particles are entrained in a stream of such gas which is discharged from a tube or tubes so as to spray the particles onto the substrate. In that case the process is particularly easy to perform and to control.

In the most preferred embodiments of the invention the oxidizable and other particles are of such composition that at least the major part of the resulting refractory mass is composed of at least one oxide. Refractory oxide masses are the most satisfactory for achieving the principal purposes of the invention.

Preferably the fine oxidizable particles are all below 50 microns in size, size meaning the maximum linear dimension of a particle. The best results are obtained with grains of an average size of less than 10 microns.

The fine oxidizable particles preferably have a specific surface, i.e. surface area to weight ratio, of at least 500 cm.²/gram. This has been found to be a very advantageous feature for obtaining high quality refractory coatings. This is so particularly, but not exclusively, when forming refractory oxide coatings starting with a mixture of particles of a cumbustible metal or metalloid with particles of one or more refractory oxides, such as those hereinafter specified as particularly satisfactory starting materials.

In the most advantageous embodiments the fine oxidizable particles have a specific surface very much higher than 500 cm.²/gram. More specifically, particular preference is given to the use of fine oxidizable particles having a specific surface above 3,000 and, optimally, above 9,000 cm.²/gram.

The size of the other particles can, if they are to undergo melting or softening, be chosen with regard to the degree of melting or softening required under the given temperature and speed conditions. It is in general advantageous for these other particles to have an average size of less than 500 microns. Preferably the said other particles are all below 500 microns in size and, according to the preferred embodiments, these particles are wholly or mainly below 300 microns in size.

The advantage of observing the aforesaid preferred upper limit for the size of the other particles is that a rapid melting is promoted. It is often better to use meltable particles which are in size range up to 500 microns but of which a significant proportion are less than 100 microns, than to use particles which are substantially all about 200 to 300 microns. In some cases it is cheaper to prepare particles to the broader size range specifications.

Advantageously, at least one-third by weight of the total quantity of other particles projected against the surface consists of particles above 200 microns in size, and at least one-quarter by weight of such total is constituted by particles below 100 microns in size. In many cases it is suitable for the total solid starting material to incorporate 35-40% by weight of particles less than 100 microns in size. By reason of the presence of a significant proportion of very fine particles the complete envelopment of the relatively larger particles by molten substance is promoted.

It is not necessary for the relatively larger particles to be melted otherwise than at their surfaces because melting of the particle cores will not contribute to the cohesion of the mass. The presence of the relatively larger particles is therefore an advantage from the point of view of heat economy because these particles absorb less heat per unit of weight.

The process may e.g. be performed so as to form a refractory mass composed of an oxide or oxides present in the starting material, and another oxide or oxides formed by oxidation during the process of the fine particles in the starting material. Alternatively, the starting material may comprise fine particles of an element or elements, together with an oxide or oxides of the same element or elements and the formed refractory mass may in that case be composed entirely of the oxide or oxides used in the starting material.

There may be chemical combination between different oxides in the formation of the refractory mass.

Refractory oxide coatings are particularly suitable for repairing or strengthening furnace linings. The formed coating can be a glass or glasses, which have very high melting temperatures, a refractory ceramic or ceramics, or a composition containing a mixture of vitreous and crystalline phases.

The fine oxidizable particles may be, and preferably are, particles of a metal, metalloid, or a sub-oxide thereof. These classes of substances include the substances hereafter specified which have been found to be particularly suitable combustibles. The purity of the metal or metalloid is preferably at least 90%, for example 95 or 97%, because this permits the composition of the coating to be made to conform to a predetermined formulation to the virtual exclusion of unwanted oxides prejudicial to the required refractory properties.

The following are very satisfactory substances for the fine oxidizable particles: aluminum, magnesium, silicon and zirconium. Those are the most preferred combustibles. Other combustible substances which can be used with good results are: calcium, manganese and iron. Of course a mixture of two or more of such combustible substances can be used.

The other particles are preferably metal oxide particles or particles of a metalloid oxide or particles of a ternary compound combining two elements in addition to oxygen.

Particlularly good results can be achieved using particles of one or more of the following refractory compounds: $Al_2O_3$, $MgO$, $SiO_2$, $ZrO_2$, $ZrSiO_4$, $Al_2O_3$, $SiO_2$, $3Al_2O_3.2SiO_2$, also spinels composed in part of $Al_2O_3$ and in part $MgO$ or $Cr_2O_3$. As an alternative to these substances a more complex substance such as clay can be used.

Particularly beneficial starting materials are those comprising, an element combinable with ozygen at least 30% aluminum and 30% zirconium, and at least one compound of oxygen with at least one of such metals, at least 70% by weight of the elements combinable with oxygen in the solid starting material being present in at least one oxygen-containing compound and at least 10% by weight of the elements combinable with oxygen in the solid starting material being present in the non oxidized state.

The starting material preferably comprises at least 20% by weight, e.g., 20 to 30% by weight, of the fine oxidizable particles. In any event, the starting material preferably comprises at least 70% by weight of particles other than the fine oxidizable particles, such other particles preferably being metal oxide particles. The proportion of fine oxidizable particles required depends of course, inter alia, on the amount of heat which must be evolved by the combustion. This in turn depends on various factors such as the initial temperature of the surface against which the particles are projected, the meltingg, softening or reaction temperature of the other particles, the delivery rate of the fine oxidizable particles and the capacity of the surface and surrounding medium to carry off the heat of combustion. The amount of heat required to be generated by combustion also depends on the surface area against which the particles are projected. For example, when forming a coating, if the jet or spray containing the particles has to be moved to and fro so as to sweep the coating area, the temperature at any given part of the coating zone will intermittently fall and this means that in order to achieve a given result the heat of combustion must be higher than would be necessary if the jet or spray were directed against a single part of the coating area for an extended period of time. Another factor which must be taken into account is the amount of any unburned oxidizable substance remaining in the coating. Particularly when using a metal as the combustible substance, it is generally advantageous for the whole of this metal to be oxidized because the oxide generally has better refractory properties than the metal. In those circumstances the use of excess metal constitutes a needless expense.

If the jet or spray containing the particles has to be moved to and fro, as mentioned above, the rate of this movement should be such as to avoid flow of the deposited coating material if the orientation of the substrate surface is such as to permit this flow.

For forming refractory coatings it is preferable for the heat evolved by the combustion reaction to raise the temperature of the substrate sufficiently to soften or melt the surface on which the refractory coating is deposited, as well as melting or superfically melting or softening the particles other than those of the combustible substance, and possibly causing different constituents of the projected mass of particles to react together chemically. The melting or softening of the substrate surface leads to a particularly good adherence of the coating to the substrate. It is also advantageous for the fine oxidizable and other particles to be selected so that the resulting deposited coating is of the same chemical composition, or is of a composition of the same type, as the substrate so that there is continuity in composition, and preferably also in structure, between the substrate and the coating.

The substrate may be pre-heated to a high temperature and/or the particles may be projected against the substrate in a hot atmosphere, to cause ignition, i.e. to start the combustion reaction.

The invention can be used for repairing or strengthening a furnace wall or lining in situ, either at the inner or the outer face of the wall and in the latter case either by starting at the site of a faulty joint which has low heat resistance and has become red hot, or by starting the combustion using a torch to heat the furnace wall or to ignite the oxidizing gas jet.

The advantage of using the invention for repairing industrial furnace walls while the furnace is in operation is considerable because the furnace can be kept in operation for a number of years without stopping production and without any deterioration in the quality of the product produced in the plant. This advantage is particularly important in relation to tank furnaces for glass making. The glass-melting furnace vault or superstructure can be repaired while the furnace is in use and without polluting the glass in the furnace. The furnace operation does not have to be disturbed in any way save possibly by stopping a particular burner or particular burners in the immediate vicinity of the spot where the repair is effected, for the brief period of the repair treatment. Wear cavities more than 20 cm. in size can be easily filled.

As already mentioned, an additional heat source may be used not only for ignition purposes but also for maintaining the temperature at the coating zone sufficiently high. Such additional heat can be provided by one or more flames directed against the surface of the substrate to be coated and/or at the zone through which the pulverulent starting mixture passes before reaching the substrate. Instead of or in addition to one or more flames, one or more electric arcs can be used. The additional heat source can normally be switched off as soon as the coating operation commences because the heat evolved in the combustion reaction will itself maintain the requisite temperature conditions.

The use of an additional heat source is sometimes desirable, for example, when forming a coating composed entirely of a particular oxide such as MgO such that it would be dangerous to incorporate a sufficient proportion of the pure metal in the starting mixture to provide the entire amount of heat required at the coating zone.

When carrying out the invention by means of oxygen or a gas with a high oxygen content, certain accident hazards are involved and, according to another aspect of the invention, apparatus having a special safety feature is provided.

Apparatus according to the invention basically includes a discharge tube connected with means whereby solid particles and an oxidizing gas can be continuously delivered to such tube to cause discharge of the gas and entrained particles therefrom, and means which is at least indirectly responsive to the advent of an operative condition or conditions indicating a risk of flash-back and which in the event that such a condition or conditions occur operates automatically to establish safe conditions.

The responsive means may operate to terminate the discharge of a normal combination of starting materials essential for combustion to occur. For example the responsive means may operate to terminate the delivery of oxidizing gas. As an alternative or in addition the responsive means may operate to terminate the supply of combustible particles.

It is preferable to provide means which operates to at least terminate the supply of oxidizing gas and also to flush the system with a gas, e.g., nitrogen, which does not support combustion.

For detecting the advent of unsafe conditions, various types of sensing devices may be used. For example, the responsive means may comprise a device which is at least indirectly responsive to a decrease below a predetermined value in the amount of gas discharging from the discharge tube.

As an alternative, or in addition, the responsive means may comprise a device sensitive to the gas pressure prevailing in the disrharge tube upstream of its discharge end. Such a device can yield a control impulse or signal if the oxidizing gas supply pressure falls below a certain predetermined safe minimum value.

The advent of unsafe conditions may also be detected by providing a device sensitive to the temperature prevailing in at least a section of the path along which gas flows before discharging from the discharge tube. For sensing a potentially dangerous rise in temperature in the gas path a fuse may be provided which melts or cuts out of the flame moves back to the location of the fuse, which location may, e.g., be within a pipe section near to the tube discharge orifice.

Of course the responsive means may comprise one or more devices in addition to a device or devices operating as above deferred to. For example, the means may comprise a device which reacts to a prohibitive fall in pressure of an available supply of flushing gas, or to a rise in temperature in a cooling circuit for cooling the discharge tube.

It is important for the best results to provide for a well controlled dosage of solid particles into the entraining gas stream. This can be achieved according to the invention by apparatus which includes a hopper for the solid starting material mounted within a chamber having means whereby it may be connected to an oxygen containing gas supply source and having an outlet through which the gas passes from such chamber to the discharge tube, the chamber also incorporating means for dosing pulverulent mixture leaving the hopper into the stream of gas passing from the chamber.

Advantageously, the hopper comprises means which are displaceable for imparting relative movement to particles contained in the lower layers of the hopper when this filled with pulverulent material.

The particles in the starting material and the surfaces of the apparatus with which they come into contact should preferably be free from traces of grease, oil or dangerous organic materials which would create a risk of premature ignition, at least when the particles are projected in an entraining stream of oxygen or a gas with a high oxygen content.

An embodiment of an apparatus according to the invention will now be described with reference to drawing FIG. 1 which shows the apparatus, partly in section.

The object to be achieved is to fill a cavity 1 which has been worn in the inner surface 5 of a wall of the furnace 2 along a joint 3 between wall blocks 4.

The apparatus includes a lance 6 used for spraying refractory material, a powder distributor 7, feed ducts and safety devices.

The lance 6 is formed of three coaxial pipes: a pulverulent mixture entrained by oxygen is sprayed from a central tube 8 which is preferably made of rust resistant steel. Two outer tubes 9 and 10 cooperate with the tube 8 to form a cooling jacket connected to a water-feed 11 and an outlet 12. The lance 6 can be introduced as shown through an aperture 13 in another wall 14 of the furnace 2. The illustrated lance 6 is straight. A curved lance can be used for reaching places which are not opposite a wall opening. For example by means of a suitably curved lance it is possible to reach a place on the inner surface of the same wall through which the lance is inserted.

The lance 6 is connected via flexible hose 16, of rubber, for example, and a rigid pipe 18, 19 to the distributor 7 to which oxygen is supplied via a conduit 22 connected to a feed 24.

The distributor 7 is preferably made of copper or a copper alloy or rust-resistant steel. It is composed of an outer casing 26 having a cover 28 formed with an aperture 30 which can be used for introducing the pulverulent mixture. The casing 26 contains a hopper 31 for holding the pulverulent mixture. Disposed beneath the casing 26 is a motor step-down gearing 32 for producing a low speed rotation of a vertical shaft 34 disposed along the vertical axis of the hopper 31 and extending into the casing 26 via packing 36. The shaft 34 carries a horizontal disc 38 and a frame 40 the shape and size of which are such that it lies adjacent the inner surface of the peripheral wall of the hopper 31. By its rotation the frame prevents the pulverulent mixture from hanging up in the hopper 31. The frame 40 can be formed by a flat section bar the leading edge of which at either side of the frame is tapered to facilitate its movement through the contents of the hopper.

The pulverulent mixture continuously discharges from the bottom of the hopper and forms a heap 42 on the disc 38. During rotation of the disc, a scraper 44 pushes material from the heap at a substantially constant rate into a funnel 46 forming the end of a conduit 19 extending through the wall of the casing 26. The scraper 44 is mounted, preferably with provision for adjustment in all directions, on an arm 48 carried by an attachment 50. The mounting includes two systems of slots and winged screws 52, 54 which permit the required adjustments. The rate at which pulverulent mixture is displaced from the disc 38 into funnel 46 is adjusted by adjusting the position of scraper 44 and the speed of motor 32. The displaced mixture is entrained by a flow of oxygen passing through the casing 26 and escaping via the path constituted by conduits 19, 18, 16, 8.

The apparatus described is more particularly suitable for continuously entraining a uniform feed of powder, without the risk of clogging. More particularly, the apparatus is suitable for entraining powders which are difficult to entrain, for instance, industrial powder mixtures of unfavorable grain size, such as mixtures comprising very fine grains and larger grains. The apparatus also works satisfactorily in cases in which the mixture has poor flow properties either because of the shape of the grains, or due to humidity, or for some other reason.

The apparatus embodies a number of safety systems. A graphite bursting disc 56 is mounted on a tube 58 in the cover 28 to prevent the casing 26 from exploding as a result of excess pressure, for instance if the powder gets hot and catches fire in the casing 26.

A fuse 60 having a low melting temperature, for instance 90° C., is disposed in the conduit 18 and blows if there is any flashback, i.e. movement of the combustion front of the mixture of oxygen and pulverulent metal upstream within the duct 8, 16, 18.

A bimetallic electric contact strip 62 is disposed in the cooling water circuit of the lance 6 so as to detect any overheating thereof, e.g., by detecting vaporisation of any water due either to cessation or considerable reduction of the water circulation.

A control box 80 houses electric control circuitry to which the fuse 60, the bimetal strip 62 and the motor 32 are connected and which is connected to a source of E.M.F. via conductor leads 81. The control circuitry is also linked with a manometer unit 64 which is responsive to the gas pressure in a branch conduit 66 for the feed of nitrogen gas, and with valves 68 and 70 in the oxygen and nitrogen feed conduits respectively. The control circuitry is also linked with a control valve 74 in a vent pipe 76 adjacent the lance 6, and with a further manometer 92 which is responsive to the gas pressure in lance 6. The control circuitry operates to close the oxygen valve 68 and to open nitrogen valve 70 in the event of the melting or cutting out of fuse 60, the displacement of bimetallic strip 62 or the absence of an operating voltage on the control circuitry. In the event that the oxygen pressure as registered by manometer 82, deviates from a predetermined value, the control circuitry likewise closes the oxygen valve and opens the nitrogen valve 70 and at the same time stops the motor 32. The opening of the nitrogen valve 70 is always accompanied by opening of the valve 74 so that the system is flushed with nitrogen part of which vents to atmosphere and part of which discharges through the lance, assuming that this is not clogged. The flushing of the system with nitrogen prevents any dangerous conflagration. Should a blockage occur upstream of the pipe 76 simultaneously with a flash-back, the nitrogen can escape at the location of the fuse 60 due to the provision at that spot of an insert 78 which is made of the same alloy as the fuse. The control circuitry also ensures closing of the oxygen valve 68 in the event that the nitrogen pressure in line 66 as registered by manometer 64 falls below a predetermined value. In the event of any of the said operations of the control circuitry a warning signal is emitted to alert the attention of supervising personnel.

The following are some examples of processes according to the invention.

EXAMPLE 1

A mixture was prepared comprising 20–22% by weight of silicon in the form of particles having a maximum size of 10 microns and a specific surface of 4,000 cm.$^2$/gram, the remainder of the mixture consisting of sand in the form of particles having a maximum size of 200 microns. A satisfactory refractory adherent coating of $SiO_2$ was formed by projecting this particle mixture by means of the above-described apparatus, at a rate of 1 kg. per minute in a stream of oxygen delivered at 200 litres per minute onto a silica furnace roof which was at a temperature of 1,400° C. The tube 8 was of 12 mm. of diameter.

EXAMPLE 2

A mixture was prepared corresponding with that specified in Example 1 except that the sand was of different grain size. In the present example two-thirds of the sand was 200 to 500 microns in size and the rest was 40 to 60 microns in size. A coating was formed by using this mixture in the same way as the mixture specified in Example 1. The mechanical resistance of the deposit was better than that formed by Example 1.

EXAMPLE 3

A mixture was prepared comprising 20–25% by weight of aluminum grains with an average size of not more than 10 microns or flakes with a specific surface of 500–10,000 cm.$^2$/gram, the remainder of the mixture being alumina particles 200 to 300 microns in size. A worn furnace lining formed of refractory blocks composed of alumina or alumino-siliceous material and having a temperature of at least 1,000° C. can be coated by a process and with an apparatus according to the invention using this mixture as the starting material. The coating formed is a refractory adherent alumina coating. A suitable feed rate is 0.5 kg. of the starting mixture per minute in a stream of oxygen delivered at 85 litres per minute. Even better results can be achieved if one half of the alumina is replaced by alumina particles with an average grain size of 60 microns or less.

EXAMPLE 4

An adherent coating composed of approximately 10% $SiO_2$, 45% $ZrO_2$ and 45% $Al_2O_3$ was formed on electrocast Zac blocks having a temperature above 1,000° C. by a process according to the invention, using apparatus as hereinbefore described, and using as the starting material a mixture comprising 17% zircon, ($ZrSiO_4$), 39.0% zirconia ($ZrO_2$), 22.5% alumina ($Al_2O_3$), each such ingredient being in the form of particles between 50 and 500 microns in size, 3.5% silicon as in Example 1, and 18% aluminum in the form of either grains or flakes as in Example 3, and using the same feed rates of the solids and of oxygen as in Example 3.

EXAMPLE 5

Refractory adherent coatings composed of $ZrO_2$ and $Al_2O_3$ were formed on electro-cast Zac blocks by a process and with an apparatus according to the invention using, at the feed rates specified in Example 3, the following starting mixture:

| Average grain size in microns— | Amount by weight, percent |
|---|---|
| $ZrO_2$, 5 | 26.5 |
| $ZrO_2$, 120–250 | 26.5 |
| $Al_2O_3$, 10 | 7.5 |
| $Al_2O_3$, 250–300 | 17.5 |
| Al, 5 | 22.0 |

EXAMPLE 6

Refractory coatings composed of $MgO \cdot Al_2O_3$ and MgO were formed on basic refractory blocks composed mainly of magnesia preheated to above 1,000° C. by a process according to the invention using a starting mixture comprising 20–22% aluminum grains or flakes as in Example 3 and at the same feed rates, the remainder of the mixture being formed by particles of electro-cast or calcined magnesia with a grain size of 200 to 300 microns.

EXAMPLE 7

A coating on refractory blocks composed mainly of magnesia was formed more rapidly than by the procedure according to Example 6 by using a mixture of particles comprising 45% electro melted MgO grains 40 to 150 microns in size, 43% calcined $Al_2O_3$ grains having an average size of 20 microns and 12% grains of aluminum approximately 15 microns in size and having a specific surface of about 1,000 cm.$^2$/gram. With this mixture the partial volatilisation of MgO was appreciably reduced. The formed deposit was essentially composed of a spinel of eutectic composition comprising 55% $Al_2O_3$ and 45% MgO.

EXAMPLE 8

Plates were formed according to to the invention by projecting a mixture as specified in Example 4, in an enclosure pre-heated to 1,100° C., against a vertical surface of a Zac plate disposed above a silica tank into which the composition forming against the said plate flowed down in liquid state into the tank.

The starting mixtures specified in the foregoing examples can be used for forming coatings on laboratory or industrial furnace linings and other structures damaged by wear, the surfaces to be coated being pre-heated to or being at at least 1,000° C. Similar coatings can be formed on masonry at higher temperatures, e.g., 1,400° C.

Figure 2:
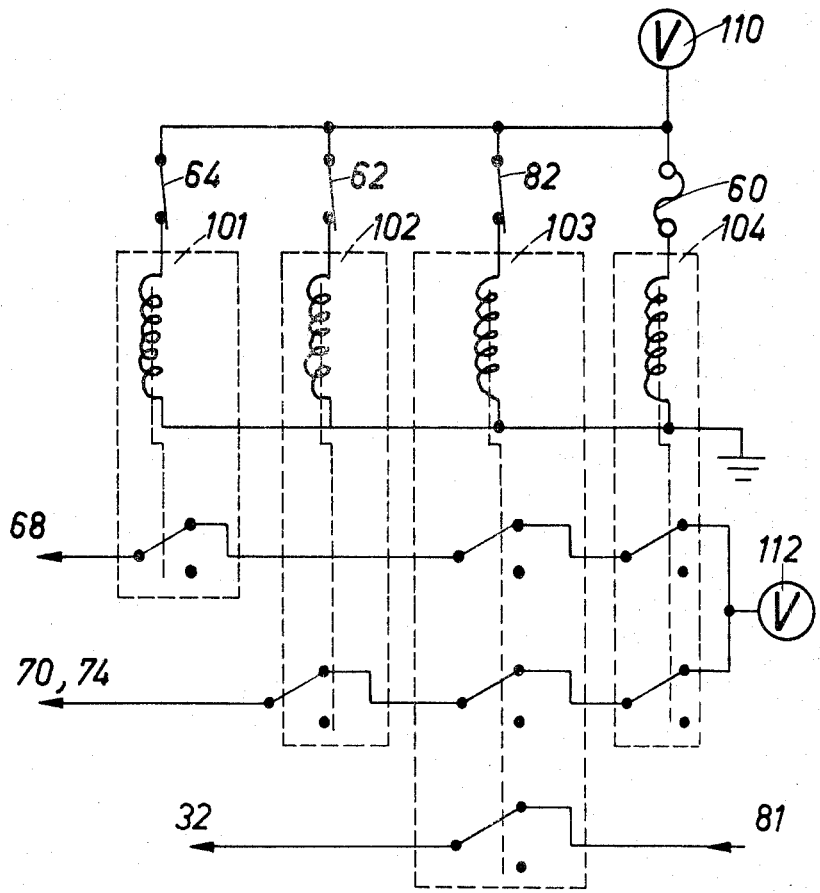
FIG. 2 is a circuit diagram of one embodiment of the control circuit of FIG. 1.

FIG. 2 illustrates one simple embodiment of the control circuit 80. This arrangement essentially includes four relays 101, 102, 103 and 104 each having its coil connected to a respective sensor. In this embodiment, the sensors 62, 64 and 82 are schematically represented as normally closed switches which open upon the occurrence of the condition for which they are to produce a response. Sensor 64 is connected in series with the coil of relay 101, sensor 62 is connected in series with the coil of relay 102 and sensor 82 is connected in series with the coil of relay 103, the other terminal of each sensor being connected to a suitable voltage source 110. Connected in series between voltage source 110 and the coil of relay 104 is the fuse 60 which will present a short circuit until it is melted. The other end of each of the relay coils is grounded.

A second voltage source 112 is connected via the contacts of the relays to valves 68, 70 and 74, the latter two valves being required to operate together. Valve 68 may be of the normally closed type, i.e. it will be closed when no operating voltage is applied thereto. Similarly, valves 70 and 74 may be of the normally open type, that is they will be open when no operating voltage is applied to them. The current path for valve 68 is provided via a switch contact of each of relays 101, 103 and 104 while the current path for valves 70 and 74 is established through separate contacts of relays 102, 103 and 104. Finally, the power to motor 32 which is supplied from the source 81 is established through a third set of contacts of relay 103.

The connections between voltage source 112 and valves 68, 70 and 74 are such that the operating state of the valves will be switched if a relay switch contact connected in the valve operating path should open due to the occurrence of a hazardous operating condition. In addition, the valves will be switched even if one of the voltage sources 110 or 112 should fail. This is highly advantageous because otherwise failure of one of the voltage sources would prevent the valves from switching if any such hazardous condition should arise.

Such a circuit could be provided with a suitable alarm by simply monitoring the voltages applied to valves 68, 70 and 74 and motor 32 to produce such alarm if any of those voltages should fall to zero.

It will be understood that the above description of the present invention is susceptible to various modifications, changes and adaptations, and the same are intended to be comprehended within the meaning and range of equivalents of the appended claims.

What is claimed is:

1. A process of forming a refractory mass comprising the steps of: projecting against a surface particles of at least one oxidizable substance which burns by combining with oxygen with accompanying evolution of heat, said particles having an average size of less than 50 microns, and particles of at least one different substance, along with a combustion supporting gas, at least one of said substances being of a composition such that under the heat of combustion of said oxidizable substance a coherent refractory mass is formed from said oxidizable substance and the different substance; and burning the oxidizable substance substantially entirely while it is being projected against such surface for forming such refractory mass.

2. A process according to claim 1 wherein the resulting coherent refractory mass remains as a deposit on said surface.

3. A process according to claim 2 wherein the resulting refractory mass firmly adheres to said surface.

4. A process according to claim 1 wherein the particles of the oxidizable substance and the particles of the different substance are mixed and projected as a mixture against said surface.

5. A process according to claim 4 wherein the resulting coherent refractory mass forms a deposit on said surface.

6. A process according to claim 4 wherein said step of projecting is carried out by entraining the mixture in a stream of combustion supporting gas.

7. A process according to claim 6 wherein the composition of said substances is such that the said refractory mass is at least mainly composed of at least one oxide.

8. A process according to claim 1 wherein said oxidizable substance is a metal.

9. A process according to claim 1 wherein the particles of the oxidizable substance have an average size of less than 10 microns.

10. A process according to claim 1 wherein the particles of the oxidizable substance have a specific surface of at least 500 cm.$^2$/gram.

11. A process according to claim 1 wherein the particles of the oxidizable substance have a specific surface of at least 3,000 cm.$^2$/gram.

12. A process according to claim 1 wherein said step of projecting is carried out by feeding particles to be projected against said surface at a controlled rate into a stream of gas and then discharging the gas against said surface with the particles entrained.

13. A process according to claim 1 wherein said at least one oxidizable substance is selected from the group consisting of aluminum, magnesium, silicon and zirconium.

14. A process according to claim 1 wherein the heat evolved by said burning step raises the temperature of said surface sufficiently at least to soften such surface.

15. A process according to claim 1 wherein the composition of said oxidizable substance and said different substance are such that the said refractory mass has a chemical composition substantially the same as the chemical composition of said surface.

16. A process according to claim 1 wherein said surface is a surface of a furnace and the refractory mass forms an adherent deposit on such surface, the furnace being maintained in operation during said process.

17. A process of forming a refractory mass comprising the steps of: projecting against a surface particles of at least one oxidizable substance which burns by combining with oxygen with accompanying evolution of heat, and particles of at least one different substance having an average size of less than 500 microns, along with a combustion supporting gas, at least one of said substances being of a composition such that under the heat of combustion of said oxidizable substance a coherent refractory mass is formed from said oxidizable substance and the different substance; and burning the oxidizable substance substantially entirely while it is being projected against such surface for forming such refractory mass.

18. A process according to claim 17 wherein at least the major part of the particles of the different substance are below 300 microns in size.

19. A process according to claim 18 wherein at least one third by weight of the total amount of particles projected against said surface consists of particles above 200 microns in size and at least one quarter by weight of such total amount of particles consists of particles below 100 microns in size.

20. A process of forming a refractory mass comprising the steps of: projecting against a surface particles of at least one oxidizable substance which burns by combining with oxygen with accompanying evolution of heat and particles of at least one different substance, along with a combustion supporting gas, 20 to 30% by weight of the total amount of particles projected against said surface being of the oxidizable substance and at least one of said substances being of a composition such that under the heat of combustion of said oxidizable substance a coherent refractory mass is formed from said oxidizable substance and the different substance; and burning the oxidizable substance substantially entirely while it is being projected against such surface for forming such refractory mass.

21. A process of forming a refractory mass comprising the steps of: projecting against a surface particles of at least one oxidizable substance which burns by combining with oxygen with accompanying evolution of heat and particles of at least one different substance comprising a material from the group consisting of $ZrO_2$, $ZrSiO_4$, along with a combustion supporting gas, at least one of said substances being of a composition such that under the heat of combustion of said oxidizable substance a coherent refractory mass is formed from said oxidizable substance and the different substance; and burning the oxidizable substance substantially entirely while it is being projected against such surface for forming such refractory mass.

22. A process of forming a refractory mass comprising the steps of: projecting against a surface particles of at least one oxidizable substance which burns by combining with oxygen with accompanying evolution of heat and particles of at least one different substance comprising a material from the group consisting of $ZrO_2$, $ZrSiO_4$, at least one of said substances being of a composition such that under the heat of combustion of said oxidizable substance a coherent refractory mass is formed from said oxidizable substance and the different substance; and burning the oxidizable substance projected against such surface for forming such refractory mass, wherein the total amount of the elements combinable or combined with oxygen, in part forming said oxidizable substance and in part being in oxidized state in said different substance, comprise 30% aluminum and 30% zirconium, 70 to 90% of said total amount being present in at least one oxygen-containing compound.

References Cited

UNITED STATES PATENTS

| | | | |
|---|---|---|---|
| 1,934,263 | 11/1933 | Hacks et al. | 264—30 |
| 2,741,822 | 5/1956 | Udy | 264—65 |
| 3,416,779 | 12/1968 | Campbell | 266—36 |
| 3,533,375 | 10/1970 | McConnell | 264—30 XR |

EDWARD G. WHITBY, Primary Examiner

U.S. Cl. X.R.

106—55, 57, 58, 69; 117—121, 160 R, DIG. 3; 239—104; 264—30

UNITED STATES PATENT OFFICE
CERTIFICATE OF CORRECTION

Patent No. 3,684,560      Dated August 15th, 1972

Inventor(s) Edgard Brichard, Maurice Jaupain, Emile Plumat and Pierre Deschepper It is certified that error appears in the above-identified patent and that said Letters Patent are hereby corrected as shown below:

Column 1, line 3, change "Edgar" to --Edgard--. Column 4, line 24, change "ozygen" to --oxygen--; line 42, change "meltingg" to --melting--. Column 6, line 13, change "disrharge" to --discharge--; line 23, before "the flame" change "of" to --if--. Column 7, line 74, change "92" to --82--. Column 8, line 64, change "85" to --80--.

Signed and sealed this 10th day of April 1973.

(SEAL)
Attest:

EDWARD M. FLETCHER, JR.
Attesting Officer

ROBERT GOTTSCHALK
Commissioner of Patents

UNITED STATES PATENT AND TRADEMARK OFFICE
CERTIFICATE OF CORRECTION

PATENT NO. : B1 3,684,560
DATED : September 3, 1991
INVENTOR(S) : Edgard BRICHARD et al It is certified that error appears in the above-identified patent and that said Letters Patent is hereby corrected as shown below:

Title page:

Item:[30] Foreign Application Priority Data, change the name of the priority country from "Belgium" to -- Luxembourg --.

Signed and Sealed this

Twenty-second Day of February, 1994

Attest:

BRUCE LEHMAN

Attesting Officer

Commissioner of Patents and Trademarks

REEXAMINATION CERTIFICATE (1543rd)
United States Patent [19]
Brichard et al.

[11] B1 3,684,560

[45] Certificate Issued Sep. 3, 1991

[54] METHOD OF FORMING REFRACTORY MASSES

[75] Inventors: Edgard Brichard, Ransart; Maurice Jaupain, Jumet; Emile Plumat, Gilly; Pierre Deschepper, Marcinelle, all of Belgium

[73] Assignee: Glaverbel SA, Brussels, Belgium

Reexamination Request:
No. 90/001,895, Nov. 20, 1989

Reexamination Certificate for:
Patent No.: 3,684,560
Issued: Aug. 15, 1972
Appl. No.: 86,532
Filed: Nov. 3, 1970

Certificate of Correction issued Apr. 10, 1973.

[30] Foreign Application Priority Data

Nov. 4, 1969 [BE] Belgium .................... 59745

[51] Int. Cl.$^5$ .................... B05D 1/08; B05D 1/02
[52] U.S. Cl. .................... 427/140; 427/422; 427/427; 239/104; 264/30; 428/323; 428/330; 428/331; 501/103; 501/105; 501/107
[58] Field of Search .................... 264/30; 427/423, 427

[56] References Cited

U.S. PATENT DOCUMENTS

| | | | |
|---|---|---|---|
| 1,934,263 | 11/1933 | Hacks et al. | 264/30 |
| 2,518,804 | 8/1950 | Marvin . | |
| 2,741,822 | 5/1956 | Udy | 264/65 |
| 2,904,449 | 9/1959 | Bradstreet . | |
| 2,943,951 | 7/1960 | Haglund . | |
| 2,964,102 | 12/1960 | Cassell et al. . | |
| 3,351,289 | 11/1967 | Demaison . | |
| 3,416,779 | 12/1968 | Campbell | 266/36 |
| 3,533,375 | 10/1970 | McConnell | 264/30 X |
| 3,598,635 | 8/1971 | Sagona . | |
| 3,627,965 | 12/1971 | Zweig . | |
| 3,637,135 | 1/1972 | Luderer . | |
| 3,800,983 | 4/1974 | Brichard . | |
| 4,792,468 | 12/1988 | Robyn | 427/422 |

FOREIGN PATENT DOCUMENTS

| | | |
|---|---|---|
| 220612 | 2/1959 | Australia . |
| 291473 | 3/1966 | Australia . |
| 416275 | 6/1967 | Australia . |
| 551151 | 4/1958 | Canada . |
| 836450 | 3/1970 | Canada . |
| 956102 | 10/1974 | Canada . |
| 144416B | 5/1983 | Denmark . |
| 2053420 | 5/1979 | Fed. Rep. of Germany . |
| 1284282 | 1/1962 | France . |
| 102083 | 5/1941 | Sweden . |
| 1330895 | 9/1973 | United Kingdom . |
| 2170122 | 7/1986 | United Kingdom . |

OTHER PUBLICATIONS

Hot Patching of Retorts by Blow-Pipe Spray Welding, The Institution of Gas Engineers, vol. 88, 1938-39, London, pp. 328-387.

F. H. Clews et al, article entitled "The Hot Patching of Gas Retorts" Part II: Experiment on the Use of Dry Powdered Cements Containing Silicon and Aluminium, published in the bulletin of the British Refractories Research Association, No. 32, pp. 286-298 (1933).

Standard Test Methods for Powders and Powder Metallurgy Products, 1985-1986 Edition, Sections 01, 05, 09, 012 and 032.

Maintenance of Coke Ovens by the Ceramic Process—Glaverbel literature—1 sheet (no date given).

Powder Metallurgy—Principles and Applications, Lenel, Metal Powder Ind. Fed., Princeton, N.J., pp. 62; 63, 23-33 (no date given).

F. H. Clews et al., article entitled "The Hot Patching of Gas Retorts", Part I: Preliminary Experiments on the Application of Certain Cements, the 23rd Report of Refractory Materials Joint Sub-Committee, pp. 733-748 (1932).

Margaret E. Harris, et al., article entitled "Burning Velocities, Quenching, and Stability Data on Nonturbulent Flames of Methane and Propane with Oxygen and Nitrogen", published in Proceedings of the Third Symposium on Combustion, Flame & Explosion Phenomena, pp. 80-83 (1949).

H. M. Cassel et al., article entitled "Factors Affecting Flame Propagation Through Dust Clouds", published in Proceedings of the Third Symposium on Combustion, Flame and Explosion Phenomena, pp. 185-190 (1949).

Whol et al., article entitled "Flame Stabilization and Quenching", published in Proceedings of the Third Symposium on Combustion, Flame and Explosion Phenomena, pp. 4-11 (1949).

J. S. Forsyth and J. E. Garside, article entitled "The Mechanism of Flashback of Aerated Flames", published in Proceedings of the Third Symposium on Combustion, Flame and Explosion Phenomena, pp. 99-102 (1949).

K. C. Brown et al., article entitled "Prevention of the Propagation of Flame in Aluminium Dust Explosion", published by the Ministry of Labour and National Service, pp. 1-15, ref. page, (1951).

Article entitled "Dust Explosions", the National Fire Protection Association, pp. 216-217.

(List continued on next page.)

*Primary Examiner*—Shrive P. Beck

[57] ABSTRACT

Method of forming refractory masses, in situ, by applying to selected location a mixture of fine particles of a substance which is capable of undergoing combustion to produce heat and particles of another substance, the substances being of such composition that such heat will cause the adhesion of the surfaces of the obtained particles, and creating the conditions for producing such combustion.

OTHER PUBLICATIONS

Murray Jacobson et al., article entitled "Explosibility of Metal Powders", published by the U.S. Bureau of Mines, (1964).

John Nagy et al., article entitled "Preventing Ignition of Dust Dispersions by Inerting", published by the U.S. Bureau of Mines, pp. 1–25 (1964).

Coulson and Richardson, excerpt from the book entitled "Chemical Engineering", published by Pergamon, pp. 867–908 (1966).

Keisuke Hiragushi et al., published in Nippon Steel Technical Report No. 19, "Flame-Gunning Repair of Coke Ovens", pp. 94–105 (1982).

Monica M. Raftery, article entitled "Explosibility Tests for Industrial Dusts", published by the British Ministry of Technology, pp. 1–10 (1968).

Excerpt from the book entitled "Dust Explosion and Fires", pp. 108–155 (1972).

K. Annett et al., article entitled "Repair of Glass Furnaces of Ceramic Welding Techniques", published in the Journal of the Canadian Ceramic Society, vol. 50, pp. 34–38 (1981).

"Ceramic Welding" (a History of the Fosbel Process Ceramic Welding), cover page, pp. 1 to 3.

John R. Lee, Ironmaking Proceedings, vol. 40, pp. 180 to 183.

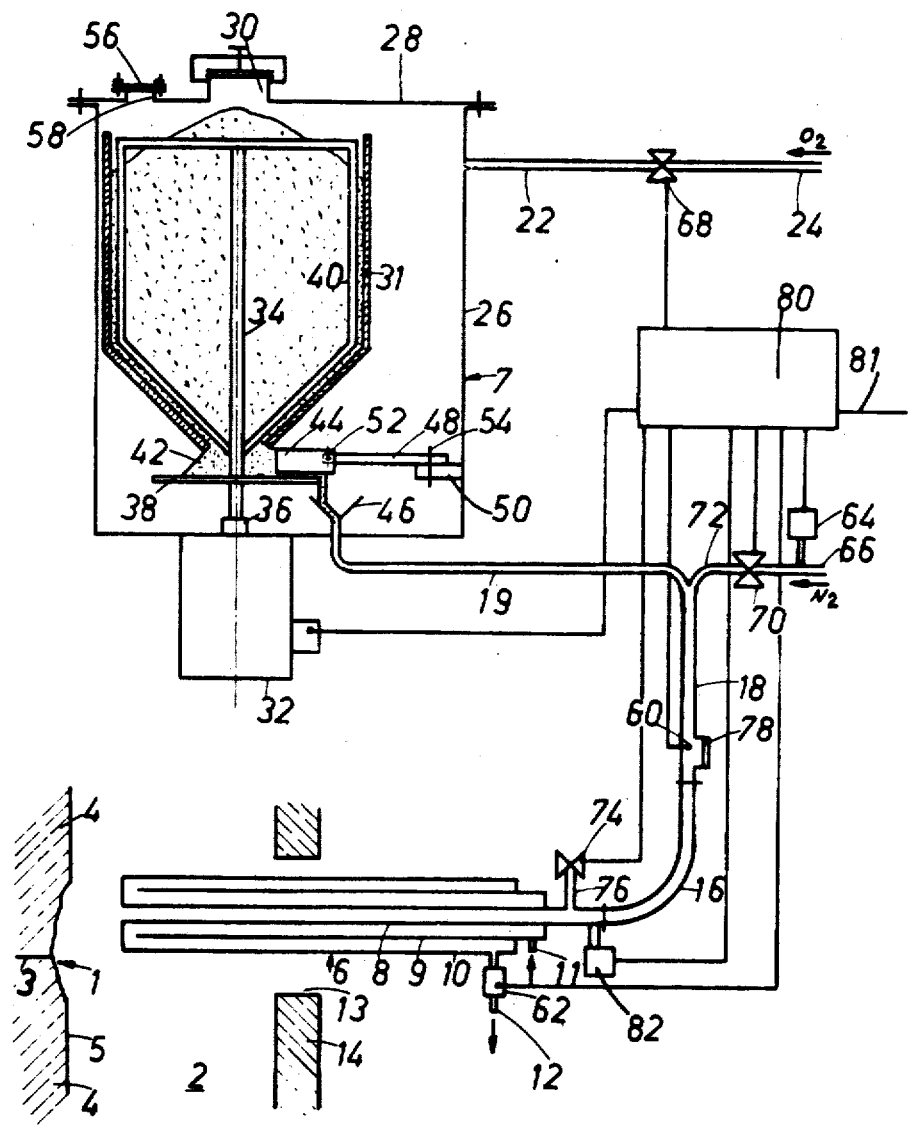

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 8, 13 and 14 is confirmed.

Claims 1-7, 9-12 and 15-22 are cancelled.

* * * * *